United States Patent
Endo

(10) Patent No.: US 9,041,846 B2
(45) Date of Patent: May 26, 2015

(54) IMAGING DEVICE, FINDER, AND DISPLAY METHOD THEREFOR

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/222,122

(22) Filed: Mar. 21, 2014

(65) Prior Publication Data

US 2014/0204262 A1 Jul. 24, 2014

Related U.S. Application Data

(63) Continuation of application No. PCT/JP2012/066684, filed on Jun. 29, 2012.

(30) Foreign Application Priority Data

Sep. 21, 2011 (JP) ................. 2011-206319

(51) Int. Cl.
*H04N 5/232* (2006.01)
*H04N 5/265* (2006.01)
*H04N 5/235* (2006.01)
*G03B 17/20* (2006.01)
(Continued)

(52) U.S. Cl.
CPC ........... *H04N 5/23293* (2013.01); *H04N 5/265* (2013.01); *H04N 5/2351* (2013.01); *G03B 17/20* (2013.01); *H04N 5/23222* (2013.01); *H04N 5/272* (2013.01); *G03B 13/06* (2013.01); *G03B 19/12* (2013.01)

(58) Field of Classification Search
CPC .. H04N 5/23293; H04N 5/2351; H04N 5/265
USPC ..................................... 348/333.01
See application file for complete search history.

(56) References Cited

U.S. PATENT DOCUMENTS 6,515,797 B2 * 2/2003 Koyama ........................ 359/431
7,706,678 B2 * 4/2010 Ikeda et al. ................... 396/296
(Continued)

FOREIGN PATENT DOCUMENTS

JP 58-114024 A 7/1983
JP 59-37777 A 3/1984
(Continued)

OTHER PUBLICATIONS

International Search Report issued in PCT/JP2012/066684, mailed on Sep. 11, 2012.
PCT/ISA/237—Issued in PCT/JP2012/066684, mailed on Sep. 11, 2012.

*Primary Examiner* — Ahmed A Berhan
(74) *Attorney, Agent, or Firm* — Birch, Stewart, Kolasch & Birch, LLP

(57) ABSTRACT

A display method for a finder includes, when at least one of a blown-out-highlight region and a blocked-up-shadow region is detected in an image signal indicating a subject image, setting a region corresponding to the detected region of a shutter unit placed in an optical path of an optical view finder in a non-light-shielding state, and setting regions other than the detected region in a light-shielding state; and superposing a subject image passing through the shutter unit and a subject image displayed on a display unit based on the image signal each other so that superposed subject images are made visible.

10 Claims, 14 Drawing Sheets

(51) Int. Cl.
 *H04N 5/272* (2006.01)
 *G03B 13/06* (2006.01)
 *G03B 19/12* (2006.01)

(56) References Cited

U.S. PATENT DOCUMENTS

2001/0028500 A1\* 10/2001 Koyama .................. 359/431
2007/0019944 A1   1/2007 Ikeda et al.
2010/0003025 A1\*  1/2010 Oikawa .................. 396/374

FOREIGN PATENT DOCUMENTS

| JP | 6-22185 A | 1/1994 |
| JP | 2007-28390 A | 2/2007 |
| JP | 2009-200552 A | 9/2009 |
| JP | 2010-2475 A | 1/2010 |
| JP | 2012-65283 A | 3/2012 |

\* cited by examiner

IMAGING DEVICE, FINDER, AND DISPLAY METHOD THEREFOR

CROSS REFERENCE TO RELATED APPLICATION

This application is a continuation of PCT International Application No. PCT/JP2012/066684 filed on Jun. 29, 2012, which claims priority under 35 U.S.C 119(a) to Japanese Application No. 2011-206319 filed on Sep. 21, 2011, all of which are hereby expressly incorporated by reference in the present application.

BACKGROUND OF THE INVENTION

1. Field of the Invention

The presently disclosed subject matter relates to an imaging device, finder, and display method therefor and, in particular, to technology using an optical view finder and an electronic view finder together.

2. Description of the Related Art

View finders indicating a picture-taking range of a camera can be classified into two types, an optical view finder (hereinafter referred to as OVF) and an electronic view finder (hereinafter referred to as EVF). In OVF, incident subject light is viewed by a photographer through an optical system. In EVF, incident subject light is converted by an image pickup element to an image signal, and a picture based on this image signal is displayed by a liquid-crystal monitor or the like to a photographer.

Japanese Patent Application Laid-Open No. 2007-028390 discloses an electronic imaging device capable of switching between OVF and EVF to display a subject image on a same finder and also switching between two finders according to the imaging state or the like.

Japanese Patent Application Laid-Open No. 2010-002475 discloses a technology in which switching is made to optical finder (OVF) display in a camera capable of switching between OVF and EVF when a scene to be taken has a severe difference between light and shade.

SUMMARY OF THE INVENTION

In the digital camera finder switchable between these OVF and EVF, EVF is suitable for taking pictures by accurately checking a picture-taking angle of view. However, EVF has a problem such that blown-out-highlight or blocked-up-shadow may occur depending on the conditions of the subject, and the blown-out-highlight region and the blocked-up-shadow region cannot be viewed.

The presently disclosed subject matter has been made in view of these circumstances, and has an object of providing an imaging device, finder, and display method therefor capable of assisting a scene that is difficult in EVF with OVF.

To achieve the above-described object, one mode of a finder includes: an imaging unit configured to convert a subject image optically received via an imaging lens to an image signal, a display unit configured to display the subject image based on the image signal, an optical view finder configured to guide the subject image incident thereon to an ocular unit, a shutter unit placed in an optical path of the optical view finder and switchable between a light-shielding state and a non-light-shielding state for each region, a superposing unit configured to superpose a subject image passing through the shutter unit and the subject image displayed on the display unit each other, a detecting unit configured to detect a blown-out-highlight region or a blocked-up-shadow region of the subject image in the image signal, and a control unit configured to control the shutter unit, the control unit setting a region which a subject image of a subject corresponding to the detected region enters in the non-light-shielding state and other regions in the light-shielding state.

According to the present mode, the blown-out-highlight region and/or the blocked-up-shadow region of the subject image is detected in the image signal, and the shutter unit placed in the optical path of the optical view finder is controlled so that the region which the subject image of the subject corresponding to the detected region enters is set in the non-light-shielding state and other regions are set in the light-shielding state. Therefore, a scene that is difficult in EVF can be assisted by OVF.

The display unit preferably does not display the blown-out-highlight region when the detecting unit detects the blown-out-highlight region of the subject image.

Also, the display unit may replace the blown-out-highlight region by black for display when the detecting unit detects the blown-out-highlight region of the subject image.

With this, the blown-out-highlight region can be appropriately assisted and displayed.

The finder preferably includes a color-difference calculating unit configured to calculate, based on the image signal, a color difference between the subject image entering the optical view finder and the subject image displayed on the display unit, wherein the control unit sets all regions in the light-shielding state when the calculated color difference is equal to a predetermined value or more.

With this, uncomfortable assisted display can be avoided.

The color-difference calculating unit may calculate the color difference based on a white balance of the image signal. With this, a color difference can be appropriately calculated.

The finder preferably includes a correcting unit configured to correct a parallax between the optical view finder and the imaging unit and cause the subject image to be displayed on the display unit.

With this, assisted display can be appropriately performed.

Preferably, the shutter unit is a liquid-crystal shutter, and the non-light-shielding state is a transmission state. With this, the light-shielding state and the non-light-shielding state can be switched.

The liquid-crystal shutter preferably has a resolution equal to a resolution of the display unit. With this, assisted display can be appropriately performed regarding the blown-out-highlight region and the blocked-up-shadow region.

To achieve the above-described object, one mode of an imaging device includes the above-described finder, a release button for a photographer to input a picture-taking instruction, a picture-taking unit configured to obtain an image signal from the imaging unit when the picture-taking instruction is inputted from the release button, and obtain a taken image based on the image signal, and an image recording unit configured to record the obtained taken image.

According to the present mode, a scene that is difficult in EVF can be assisted by OVF.

To achieve the above-described object, one mode of a display method is for a finder including an optical view finder configured to guide a subject image incident thereon to an ocular unit, a shutter unit placed in an optical path of the optical view finder and switchable between a light-shielding state and a non-light-shielding state for each region, an imaging unit configured to convert a subject image optically received via an imaging lens to an image signal, a display unit configured to display the subject image based on the image signal, and a superposing unit configured to superpose a subject image entering the optical view finder and passing through the shutter unit and the subject image displayed on the display unit each other, the method including a detecting step of detecting a blown-out-highlight region or a blocked-up-shadow region of the subject image in the image signal, and a control step of setting a region which a subject image of a subject corresponding to the detected region enters in the non-light-shielding state and other regions in the light-shielding state.

According to the presently disclosed subject matter, a scene that is difficult in EVF can be assisted by OVF.

DETAILED DESCRIPTION OF EXEMPLARY EMBODIMENTS

According to the attached drawings, embodiments of the presently disclosed subject matter are described in detail below.

[First Embodiment]

Figure 1:
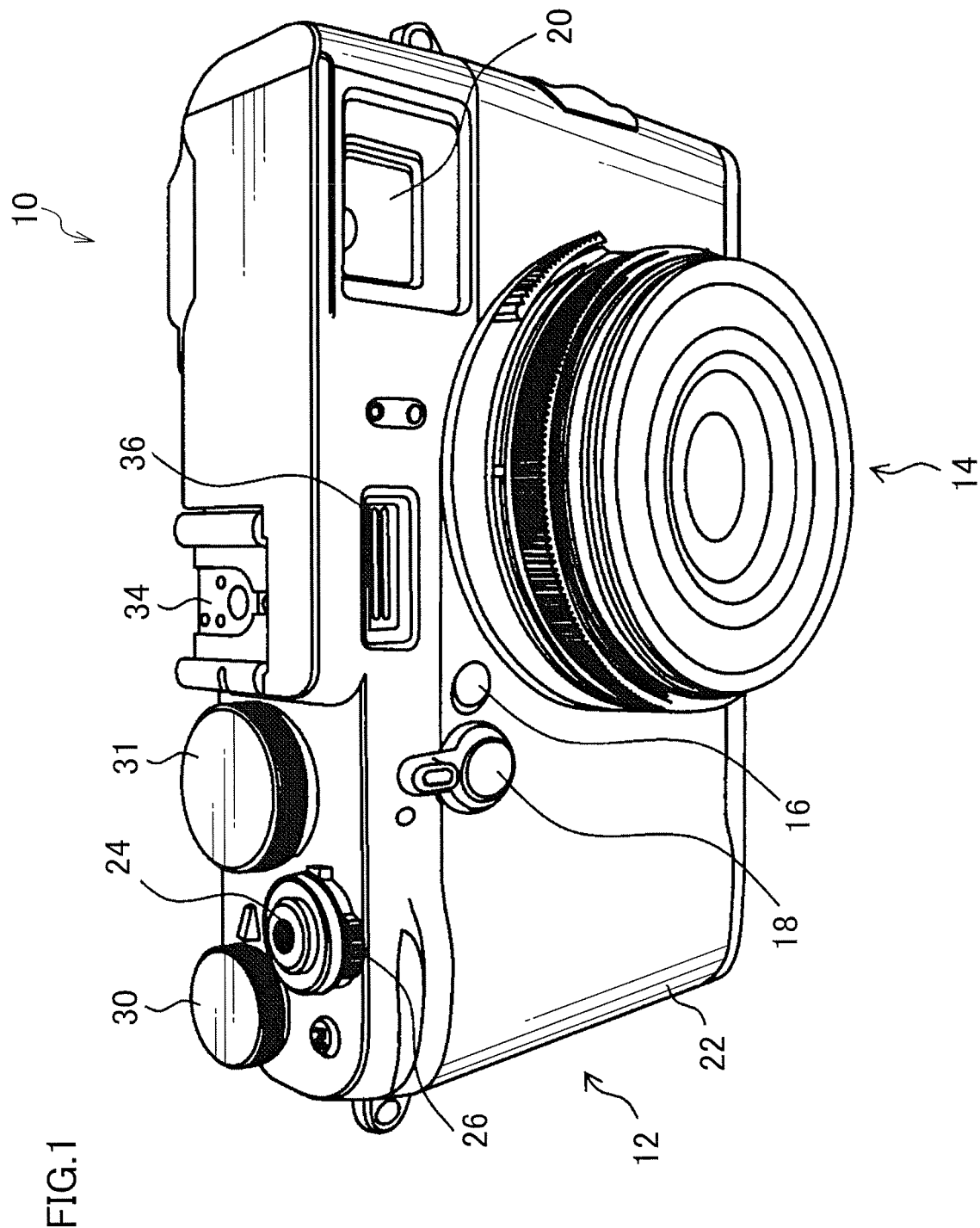
FIG. 1 is a front perspective view depicting an outer appearance structure of a digital camera.
Figure 2:
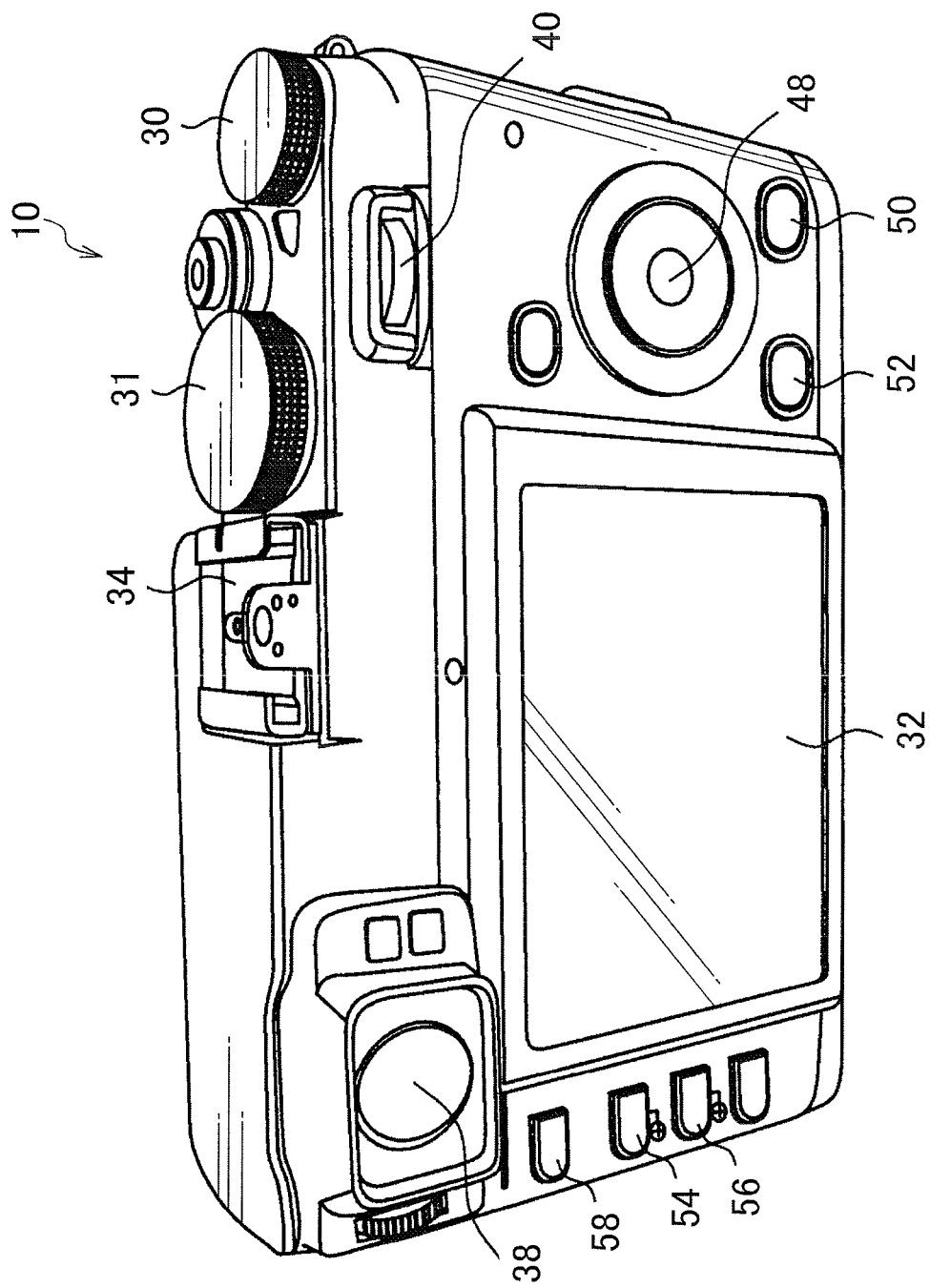
FIG. 2 is a back perspective view depicting the outer appearance structure of the digital camera.

FIG. 1 and FIG. 2 are a front perspective view and a back perspective view, respectively, depicting an outer appearance structure of a digital camera 10 according to the present embodiment.

As depicted in the drawings, the digital camera 10 of the present embodiment includes a camera body 12 and a taking lens 14 mounted on the camera body 12. The taking lens 14 may be removably configured of a lens-side mount and a camera-side mount.

The front of the camera body 12 is provided with an AF auxiliary light lamp 16, a finder switch lever 18, a finder objective unit 20, a grip 22, and others. The upper surface of the camera body 12 is provided with a shutter button (a release button) 24, a power supply lever 26, an exposure correction dial 30, a shutter speed dial 31, an accessory shoe 34, a strobe 36, and others.

The back surface of the camera body 12 is provided with a finder ocular unit (an ocular unit of a finder) 38, a command lever 40, a liquid-crystal monitor 32, a cross button 48, a RAW button 50, a back button 52, an AE selection button 54, an AF selection button 56, a replay button 58, and others.

A subject image is checked via the finder ocular unit 38. By viewing through this finder ocular unit 38, a photographer can observe the subject image. The shutter button 24 is of two stages, a full push and a halfway push. AE (Automatic Exposure) and AF (Automatic Focus adjustment) operations are performed at the time of a halfway push, and the present picture taking is performed at the time of a full push. In the present picture taking, an image obtained by picture taking (the present taken image) is recorded on a memory card (240 in FIG. 4). Also, the image recorded on the memory card is replayed and displayed on the liquid-crystal monitor 32 by setting a camera mode in a replay mode (in the present embodiment, pressing a replay button 58).

Figure 3:
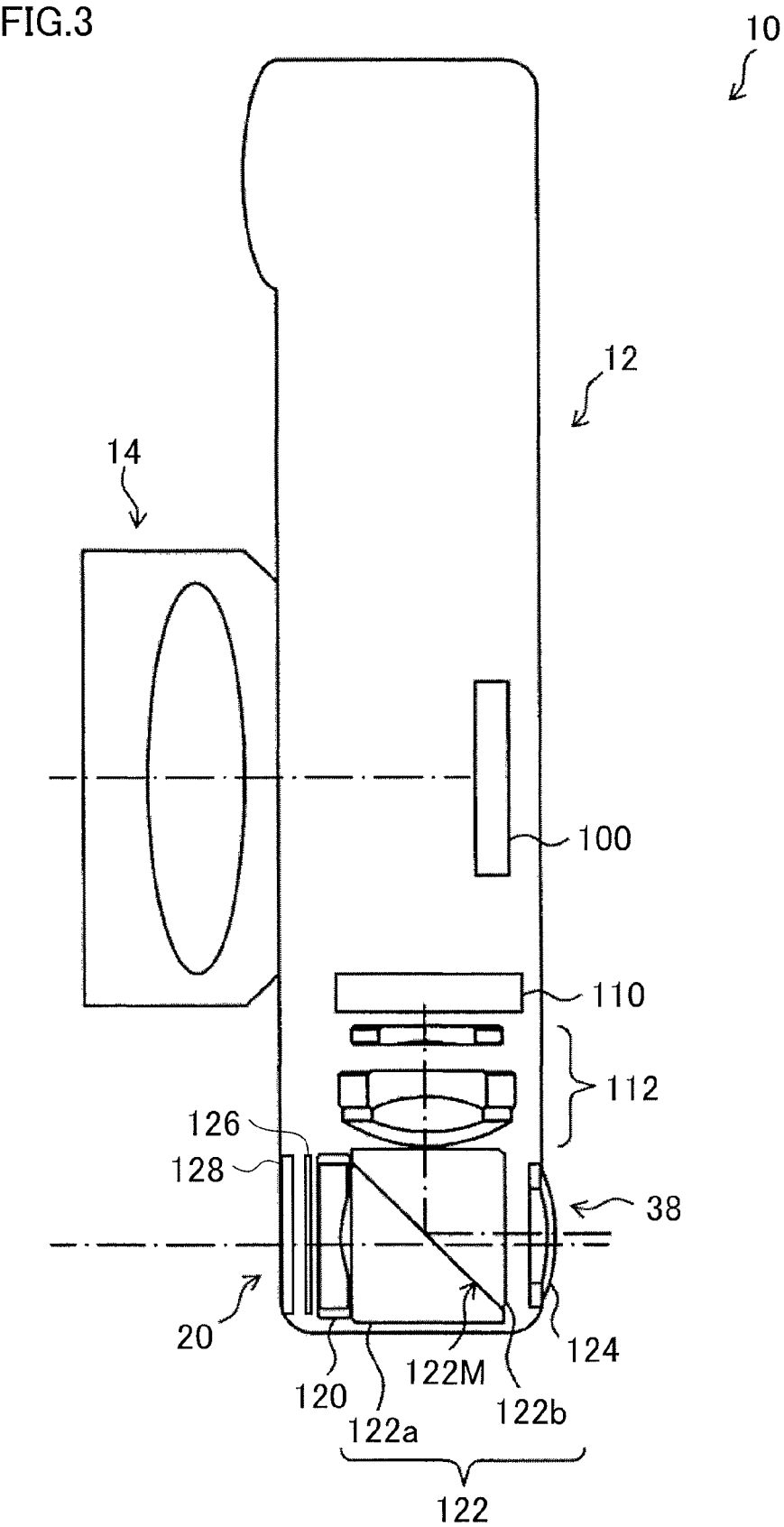
FIG. 3 is an upper sectional view of the digital camera.

FIG. 3 is an upper sectional view of the digital camera 10. As depicted in the drawing, the digital camera 10 includes a CCD (Charge Coupled Device) 100, a liquid-crystal plate 110, an EVF lens 112, an objective lens 120, a prism 122, an ocular lens 124, a liquid-crystal shutter 126, a finder window 128, and others.

Subject light transmitting through the taking lens 14 enters a light-receiving surface of the CCD 100. The CCD 100 receiving the subject light performs conversion, by each of two-dimensionally arranged sensors, to a signal charge of an amount according to the incident light amount. From this signal charge, an image signal is generated by various signal processing circuits. Based on thus generated image signal, an image obtained by laterally inverting a subject image is displayed on the liquid-crystal plate 110.

The liquid-crystal plate 110 is a liquid-crystal panel with a resolution of, for example, 1600×900 pixels. On the liquid-crystal plate 110, together with the image obtained by laterally inverting the subject image, a frame indicating a picture-taking range is displayed based on the focal length (the angle of view) of the taking lens 14.

A lower portion in the drawing of the liquid-crystal plate 110 is provided with the EVF lens 112. Also, the prism 122 is placed between the EVF lens 112 and the ocular lens 124.

The prism 122 is configured of a first prism 122a and a second prism 122b. At a portion where the first prism 122a and the second prism 122b are jointed, a half-mirror surface 122M is formed. This half-mirror surface 122M is set so as to be tilted at 45° with respect to the optical axis of the EVF lens 112. The image displayed on the liquid-crystal plate 110 is enlarged by the EVF lens 112, horizontally inverted by the half-mirror surface 122M, and reflected in a right direction in the drawing. The image (erect normal image) reflected by the half-mirror surface 122M enters the ocular lens 124.

Subject light enters the finder objective unit 20 from a route (an optical path) different from that of the taking lens 14. The subject light enters the finder objective unit 20 from the finder window 128. At a subsequent stage of the optical path of the finder window 128, the liquid-crystal shutter 126 and the objective lens 120 are sequentially placed.

The liquid-crystal shutter 126 is placed in parallel with the finder window 128 and the objective lens 120 so as to be perpendicular to the optical axis of the subject light entering from the finder window 128. The liquid-crystal shutter 126 is a liquid-crystal panel having a liquid-crystal layer enclosed between paired substrates and having a polarizing direction changed by a voltage applied to the liquid-crystal layer.

The liquid-crystal shutter 126 has a resolution equal to the display resolution of the liquid-crystal plate 110 (in the present embodiment, a resolution of 1600×900 pixels). Under the control of a display control circuit 242 (refer to FIG. 4), the liquid-crystal shutter 126 is configured to be switchable for each pixel between a light-shielding state of shielding subject light entering from the finder window 128 and a transmission state (a non-light-shielding state) of letting subject light pass therethrough.

If an entire region (all pixels) of the above-described liquid-crystal shutter 126 is in a transmission state, subject light entering the finder objective unit 20 from an optical path different from that of the taking lens 14 enters the objective lens 120 via the liquid-crystal shutter 126, further transmits through the half-minor surface 122M, and enters the ocular lens 124. A concave lens is used as the objective lens 120, and a convex lens is used as the ocular lens 124, thereby configuring an inverse-Galileo-type finder.

As such, the digital camera 10 includes OVF guiding subject light entering from the finder objective unit 20 to the finder ocular unit 38 and EVF guiding a picture displayed on the liquid-crystal plate 110 to the finder ocular unit 38. And, with both placed on the same optical path by the half-mirror surface 122M, these pictures are superposed each other to be guided to the finder ocular unit 38. That is, these two finders function as a hybrid finder through which the photographer can observe superposed pictures.

In the case of the digital camera 10, an optical axis of the imaging unit of EVF including the taking lens 14 and the CCD 100 and an optical axis of OVF including the finder objective unit 20 and the finder ocular unit 38 are different from each other, and there is a parallax therebetween. Therefore, if the image signal generated based on the subject image light-received by the CCD 100 is displayed as it is on the liquid-crystal plate 110, the position in the picture of OVF and the position in the image of EVF are different even with the same subject. That is, for superposition display of the picture of OVF and the image of EVF, it is required to perform parallax correction.

For parallax correction, a distance between the digital camera 10 and each subject is first measured. For the distance from each subject, it can be through to use, for example, a phase-difference AF scheme. In the phase-difference AF scheme, light from the subject is obtained by paired distance-measurement sensors and, from a phase difference between outputs from the distance-measurement sensors, a distance from the subject is calculated by triangulation. The distance from each subject may be measured by a method different from the above.

Next, in an image signal processing circuit 234 (refer to FIG. 4), based on the above-calculated distance between the digital camera 10 and each subject, each subject of a taken image generated in advance (an image taken by the CCD 100) is moved so as to coincide with the position of the same subject of the picture of OVF.

When the above-generated image is displayed on the liquid-crystal plate 110, the image is guided to the finder ocular unit 38 with the position of each subject of the picture of OVF and the position of each subject of the image of EVF coinciding with each other.

Also, the angle of view of the OVF optical system (the objective lens 120 and the ocular lens 124) and the angle of view of the EVF optical system (the taking lens 14) are different from each other, the image taken by the CCD 100 is enlarged or reduced based on the difference in the angle of view and is displayed on the liquid-crystal plate 110.

[Electrical Structure of Camera]

Figure 4:
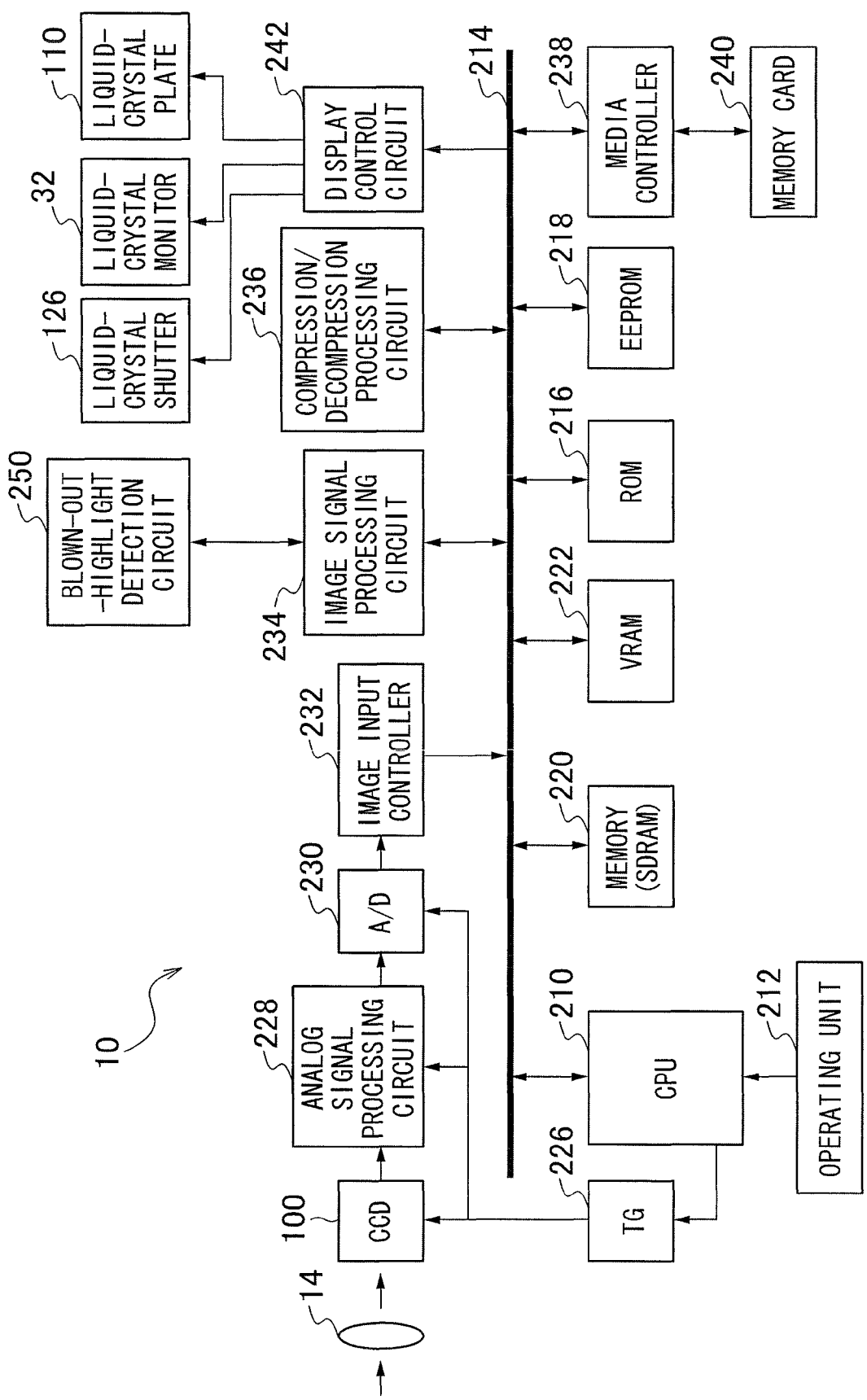
FIG. 4 is a block diagram depicting an electrical structure of a digital camera according to a first embodiment.

FIG. 4 is a block diagram depicting an electrical structure of the digital camera 10. As depicted in the drawing, the digital camera 10 includes the liquid-crystal monitor 32, the CCD 100, the liquid-crystal plate 110, the liquid-crystal shutter 126, a CPU 210, an operating unit (various operation buttons such as a shutter button, a power supply lever, an exposure correction dial, a shutter speed dial, a command lever, a cross button, a back button, and a replay button) 212, a ROM (Read-Only Memory) 216, an EEPROM (Electrically Erasable Programmable Read-Only Memory) 218, a memory (SDRAM (Synchronous Dynamic Random Access Memory)) 220, a VRAM (Video Random Access Memory) 222, a timing generator (TG) 226, an analog signal processing circuit 228, an A/D converter 230, an image input controller 232, the image signal processing circuit 234, a compression/decompression processing circuit 236, a media controller 238, a memory card 240, and the display control circuit 242.

The CPU 210 functions as a control unit which controls the operation of the entire digital camera 10 including the taking lens 14 mounted on the camera body 12 in a centralized manner. The CPU 210 controls each unit of the digital camera 10 by following a predetermined control program based on an input from the operating unit 212.

In the ROM 216, the control program to be executed by this CPU 210, various data required for control, and others are stored. In the EEPROM 218, various setting information and others regarding the operation of the digital camera are stored, such as user setting information.

The memory (SDRAM) 220 is used as an arithmetic work region for the CPU 210 and is used also as a temporary storage region of image data. The VRAM 222 is used as a storage region dedicated to image data for display.

The CCD 100 is placed at a subsequent stage of the taking lens 14, and receives subject light passing through the taking lens 14. The CCD 100 includes a light-receiving surface with many light-receiving elements arranged in a matrix shape. An image of the subject light passing through the taking lens 14 is formed on this light-receiving surface of the CCD 100, and is converted to an electrical signal by each light-receiving element. As the image pickup element, not only the CCD 100 but also a CMOS (Complementary Metal Oxide Semiconductor) may be used.

In synchronization with a vertical transfer clock and a horizontal transfer clock supplied from the timing generator (TG) 226, this CCD 100 outputs an electric charge stored in each pixel line by line as a serial image signal. The CPU 210 controls the TG 226 to control driving of the CCD 100.

Note that an electric charge storage time (an exposure time) of each pixel is determined by an electronic shutter drive signal given from the TG 226. The CPU 210 indicates the electric charge storage time to the TG 226.

Also, the image signal is started to be outputted when the digital camera 10 is set in a picture-taking mode. That is, when the digital camera 1 is set in a picture-taking mode, the image signal is started to be outputted in order to display a through image on the liquid-crystal monitor 32. This output of the image signal for the through image is once stopped when an instruction for the present picture taking is performed, and is again started when the present picture taking ends.

The image signal outputted from the CCD 100 is an analog signal, and this analog image signal is captured into the analog signal processing circuit 228.

The analog signal processing circuit 228 includes a correlated double sampling (CDS) circuit and an automatic gain control (AGC) circuit. The CDS removes noise included in the image signal. The AGC amplifies the noise-removed image signal with a predetermined gain. The analog image signal subjected to predetermined signal processing in this analog signal processing circuit 228 is captured into the A/D converter 230.

The A/D converter 230 converts the captured analog image signal to a digital image signal with a gray-scale width of predetermined bits. This image signal is so-called RAW data, having gray-scale values indicating R, G, and B for each pixel.

The image input controller 232 has a line buffer of a predetermined capacity incorporated therein, accumulating image signals for one frame outputted from the A/D converter 230. The image signals for one frame accumulated in the image input controller 232 are stored in the memory (SDRAM) 220 via a bus 214.

To the bus 214, the CPU 210, the memory 220, the image input controller 232, the image signal processing circuit 234, the compression/decompression processing circuit 236, the display control circuit 242, the media controller 238, and others described above are connected. These can be configured so as to transmit and receive information to and from each other via the bus 214.

The image signals for one frame stored in the memory 220 are captured into the image signal processing circuit 234 in a dot-sequential manner (in the order of the pixels).

The image signal processing circuit 234 subjects the image signals of the respective R, G, and B colors captured in the dot-sequential manner to predetermined signal processing, and generates an image signal (a Y/C signal) formed of a luminance signal Y and color-difference signals Cr and Cb.

Also, a blown-out-highlight detection circuit 250 is connected to the image signal processing circuit 234. This blown-out-highlight detection circuit 250 detects a pixel where the pixel's luminance value is saturated, that is, a blown-out-highlight region of the subject, in the image signals stored in the memory 220. Note that a region with a luminance value equal to a predetermined value or more, the predetermined value smaller than the luminance value at the time of saturation may be detected as a blown-out-highlight region.

The compression/decompression processing circuit 236 performs predetermined compression processing on the image data generated by the image signal processing circuit 234 by following an instruction from the CPU 210, thereby generating compressed image data. Also, the compression/decompression processing circuit 236 performs predetermined decompression processing on the compressed image data, thereby generating non-compressed image data.

The media controller 238 records image data obtained by picture taking in the memory card 240 and reads the recorded image from the memory card 240, by following an instruction from the CPU 210.

The display control circuit 242 controls display of the liquid-crystal monitor 32 and the liquid-crystal plate 110 by following an instruction from the CPU 210. The display control circuit 242 controls the liquid-crystal shutter 126, which will be described in detail further below.

A general image recording procedure of the above-structured digital camera 10 is described.

When a picture-taking instruction is inputted to the CPU 210 with the shutter button 24 fully pressed, the CPU 210 performs predetermined picture-taking control to cause an image for one frame to be taken by the CCD 100.

R, G, and B image signals for one frame imaged by the CCD 100 are stored in the memory 220 via the analog signal processing circuit 228, the A/D converter 230, and the image input controller 232, and are added from the memory 220 to the image signal processing circuit 234. The image signal processing circuit 234 subjects the inputted image signals to predetermined signal processing to generate image data formed of luminance data and color-difference data.

The generated image data is once stored in the memory 220, then added to the compression/decompression processing circuit 236 and subjected to predetermined compression processing, and is then again stored in the memory 220.

The CPU 210 causes generation of an image file of a predetermined format with predetermined picture-taking information added to the compressed image data stored in the memory 220, and causes the generated image file in the memory card 240 via the media controller 238.

The image data thus recorded in the memory card 240 is read from the memory card 240 in response to a replay instruction, and is replayed and displayed on the liquid-crystal monitor 32. That is, when a replay instruction is inputted to the CPU 210 via the replay button, the CPU 210 reads the compressed image data of an image file lastly recorded in the memory card 240 via the media controller 238. The read compressed image data is added to the compression/decompression processing circuit 236, is changed to non-compressed image data, and is then stored in the VRAM 222. Then, the image file stored in this VRAM 22 is added to the display control circuit 242, converted to a signal format for monitor display, and is then outputted to the liquid-crystal monitor 32. With this, the image recorded on the memory card 240 is replayed and displayed on the liquid-crystal monitor 32.

Also, when an instruction for image frame advance is provided by using the cross button or the like, the next image is read from the memory card 240, and is replayed and displayed on the liquid-crystal monitor 32. Also, if an instruction for frame return is provided, the immediately-preceding image is read from the memory card 240, and is replayed and displayed on the liquid-crystal monitor 32.

[Finder Display Process: First Embodiment]

Figure 5:
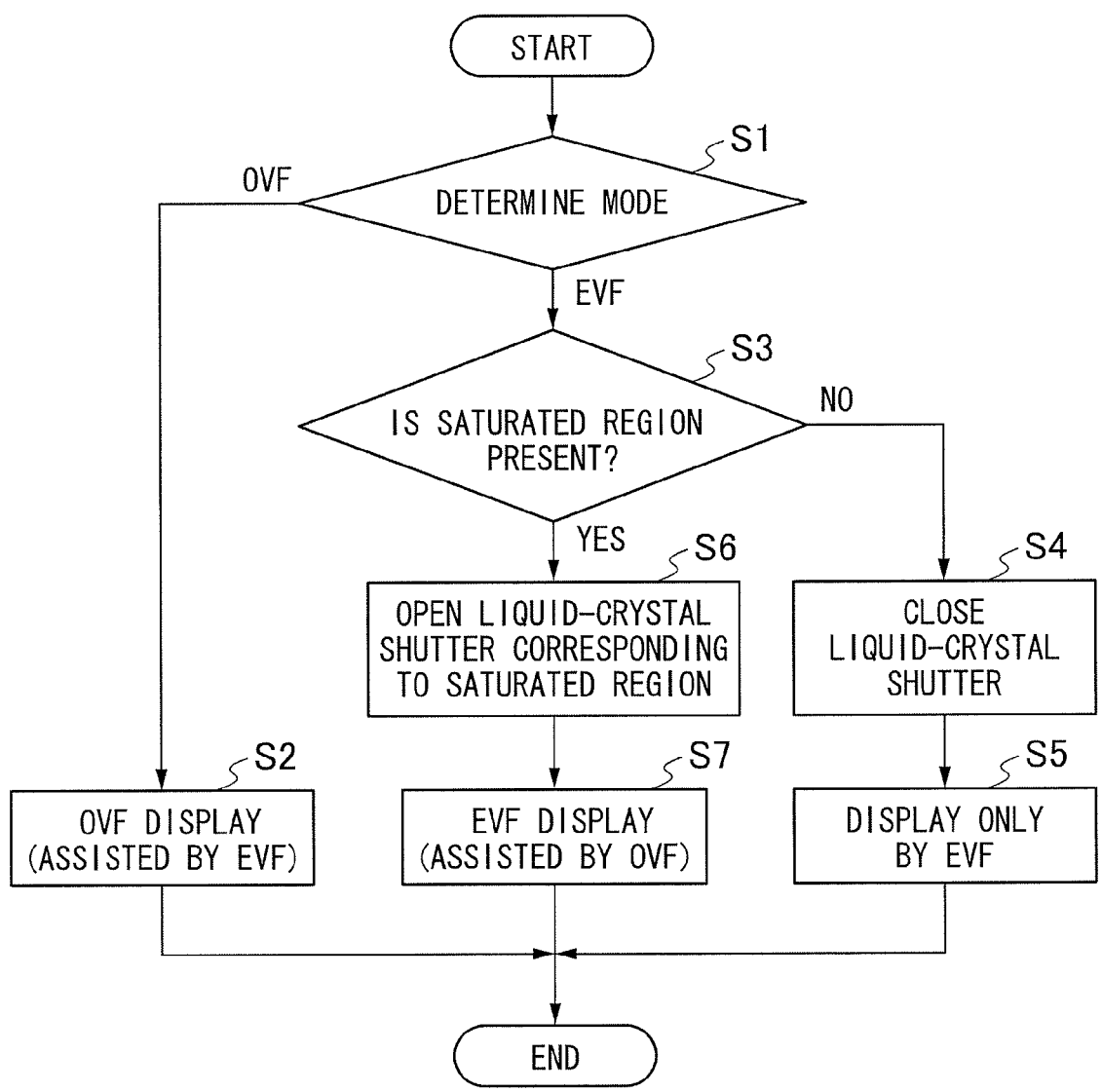
FIG. 5 is a flowchart depicting a display process of a finder according to the first embodiment.

FIG. 5 is a flowchart depicting a finder display process according to the first embodiment.

First, it is determined whether a finder mode set in the digital camera 10 is OVF or EVF (step S1). The digital camera 10 can be switched between an OVF mode and an EVF mode by the finder switch lever 18. By operating the finder switch lever 18, the user can select a desired finder mode.

When the OVF mode is set, OVF display is performed (step S2). That is, the display control circuit 242 sets the entire region of the liquid-crystal shutter 126 in a transmission state. With this, subject light entering from the finder objective unit 20 is guided to the finder ocular unit 38. Also, in addition to a frame, assist information is displayed on the liquid-crystal plate 110, such as aperture, shutter speed, picture-taking sensitivity (ISO speed), an exposure correction bar, and the number of pictures that can be taken. With this, assist information displayed on the liquid-crystal plate 110 is guided to the finder ocular unit 38.

Therefore, by viewing through the finder ocular unit 38, the user can view the subject light entering from the finder objective unit 20 together with the assist information displayed on the liquid-crystal plate 110.

By contrast, when the EVF mode is set, the blown-out-highlight detection circuit 250 detects a saturated pixel in the image signals obtained by picture-taking by the CCD 100 and stored in the memory 220 (step S3).

When no saturated pixel is present, the display control circuit 242 sets the entire region of the liquid-crystal shutter 126 in a light-shielding state (step S4), and normal EVF display is performed (step S5). Here, the image displayed on the liquid-crystal plate 110 is horizontally inverted by the half-mirror surface 122M to be guided to the finder ocular unit 38. Therefore, the display control circuit 242 causes the image signal obtained by picture-taking by the CCD 100 and stored in the memory 220 to be displayed as being horizontally inverted.

With this, the user can view the EVF image by viewing through the finder ocular unit 38. Here, the assist information may be simultaneously displayed on the liquid-crystal plate 110.

Figure 6A:
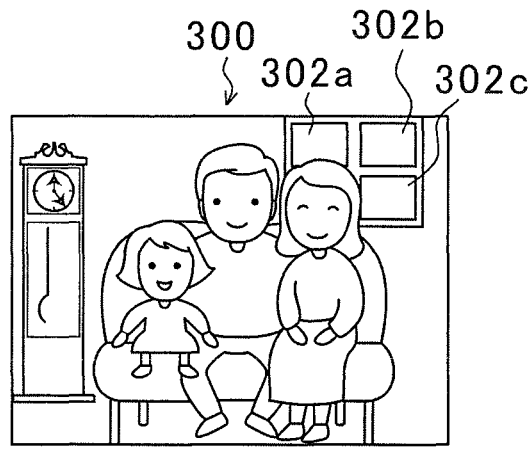
FIG. 6A is a diagram depicting an example of an image taken by a CCD.

On the other hand, the case in which a saturated pixel is present in the determination at step S3 is described by using FIG. 6A to FIG. 6D. FIG. 6A is a diagram depicting an example of an image 300 taken by the CCD 100. This image 300 is an image taken indoors. Here, it is assumed that each pixel in a region corresponding to a widow glass portion which external light enters is saturated. The blown-out-highlight detection circuit 250 detects saturated regions 302a, 302b, and 302c.

When saturated regions are detected as in FIG. 6A, the procedure goes to step S6. At step S6, the display control circuit 242 takes a parallax between OVF and EVF into consideration and, among the pixels of the liquid-crystal shutter 126, sets a pixel which subject light of the subject corresponding to the detected saturated region in a transmission state and other pixels in a light-shielding state. That is, the liquid-crystal shutter 126 is controlled so that, of the subject light entering from the finder objective unit 20, only the region corresponding to the blown-out-highlighted subject becomes transmissive and other regions are light-shielded.

Figure 6B:
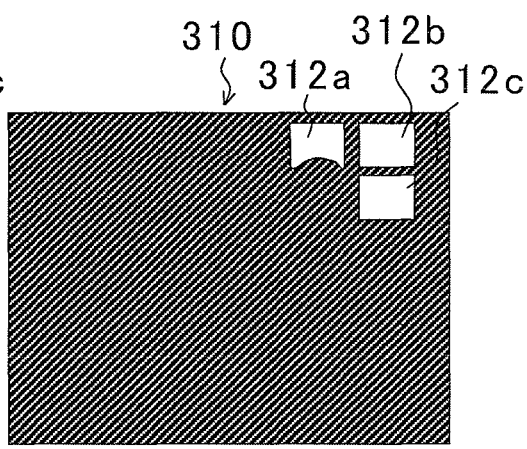
FIG. 6B is a diagram depicting a transmission state and a light-shielding state of a liquid-crystal shutter.

FIG. 6B is a diagram depicting the state in which, in an entire region (a region viewable in the finder ocular unit 38) 310 of the liquid-crystal shutter 126, regions 312a, 312b, and 312c which subject light of the subjects corresponding to the saturated regions 302a, 302b, and 302c of the image 300 depicted in FIG. 6A are set in a transmission state and other regions are set in a light-shielding state.

Furthermore, the display control circuit 242 performs EVF display (step S7). Here, the image displayed on the liquid-crystal plate 110 is horizontally inverted by the half-mirror surface 122M to be guided to the finder ocular unit 38. Therefore, the liquid-crystal plate 110 displays the image taken by the CCD 100 as being horizontally inverted.

Here, the display control circuit 242 does not cause display of the subjects corresponding to the saturated regions 302a, 302b, and 302c of the CCD 100. Instead of no display, the subjects may be displayed as being replaced by black.

Figure 6C:
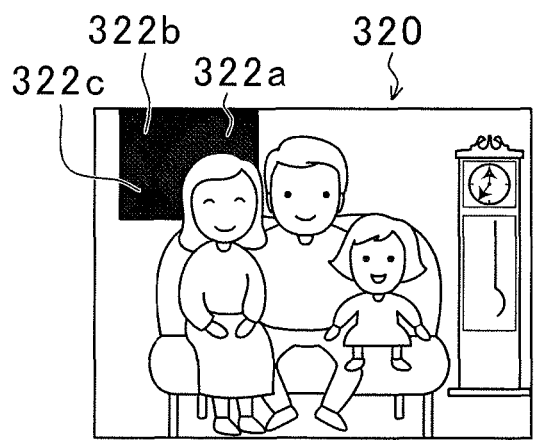
FIG. 6C is a diagram depicting a display of a liquid-crystal plate.

FIG. 6C is a diagram depicting an image 320 with the regions 322a, 322b, and 322c of the subjects corresponding to the saturated regions 302a, 302b, and 302c of the CCD 100 replaced by black and with the image 300 displayed on the liquid-crystal plate 110 as being horizontally inverted.

The image 320 displayed on the liquid-crystal plate 110 in the above-described manner is horizontally inverted by the half-mirror surface 122M, and enters the ocular lens 124.

On the other hand, of the subject light entering the finder objective unit 20, only subject light entering regions 312a, 312b, and 312c of the liquid-crystal shutter 126 passes through the liquid-crystal shutter 126, and other regions are light-shielded. The subject light passing through the regions 312a, 312b, and 312c of the liquid-crystal shutter 126 passes through the objective lens 120 and the half-mirror surface 122M and enters the ocular lens 124.

As such, subject light passing through the regions 312a, 312b, and 312c of the liquid-crystal shutter 126 and further passing through the objective lens 120 and the half-mirror surface 122M is superposed on the image displayed on the liquid-crystal plate 110 and horizontally inverted by the half-mirror surface 122M.

Figure 6D:
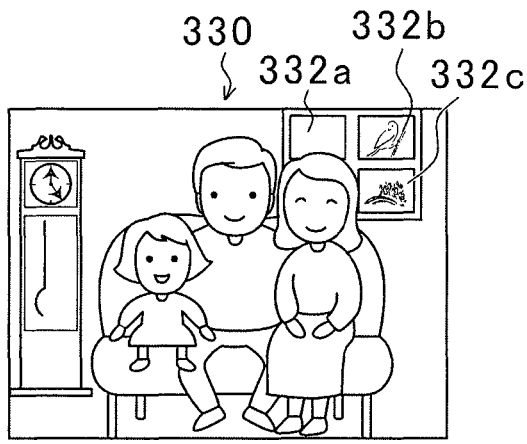
FIG. 6D is a diagram depicting an image viewed from an ocular unit of the finder.

FIG. 6D is a diagram depicting an image 330 viewed from the finder ocular unit 38. As depicted in the drawing, regions 332a, 332b, and 332c are displayed on the liquid-crystal plate 110 as being replaced by black and furthermore, the OVF picture can be viewed since caused to pass through the liquid-crystal shutter 126. Therefore, the subjects in these regions 332a, 332b, and 332c are not blown-out-highlighted, and the subjects can be appropriately confirmed.

Also, regarding regions other than the regions 332a, 332b, and 332c, since the OVF picture is light-shielded by the liquid-crystal shutter 126, the image on EVF (liquid-crystal plate 110) can be viewed.

As such, according to the present embodiment, when EVF display is made in a camera with OVF and EVF capable of superposition display, a blown-out-highlight region of EVF can be assisted and displayed by OVF. Therefore, a blown-out-highlighted subject, which cannot be viewed with EVF, can be viewed.

While the liquid-crystal shutter 126 has the same resolution as the resolution of the liquid-crystal plate 110 in the present embodiment, the resolution of the liquid-crystal shutter 126 may be lower than the resolution of the liquid-crystal plate 110. In this case, OVF display is made regarding part of the blown-out-highlight region.

[Second Embodiment]

Figure 7:
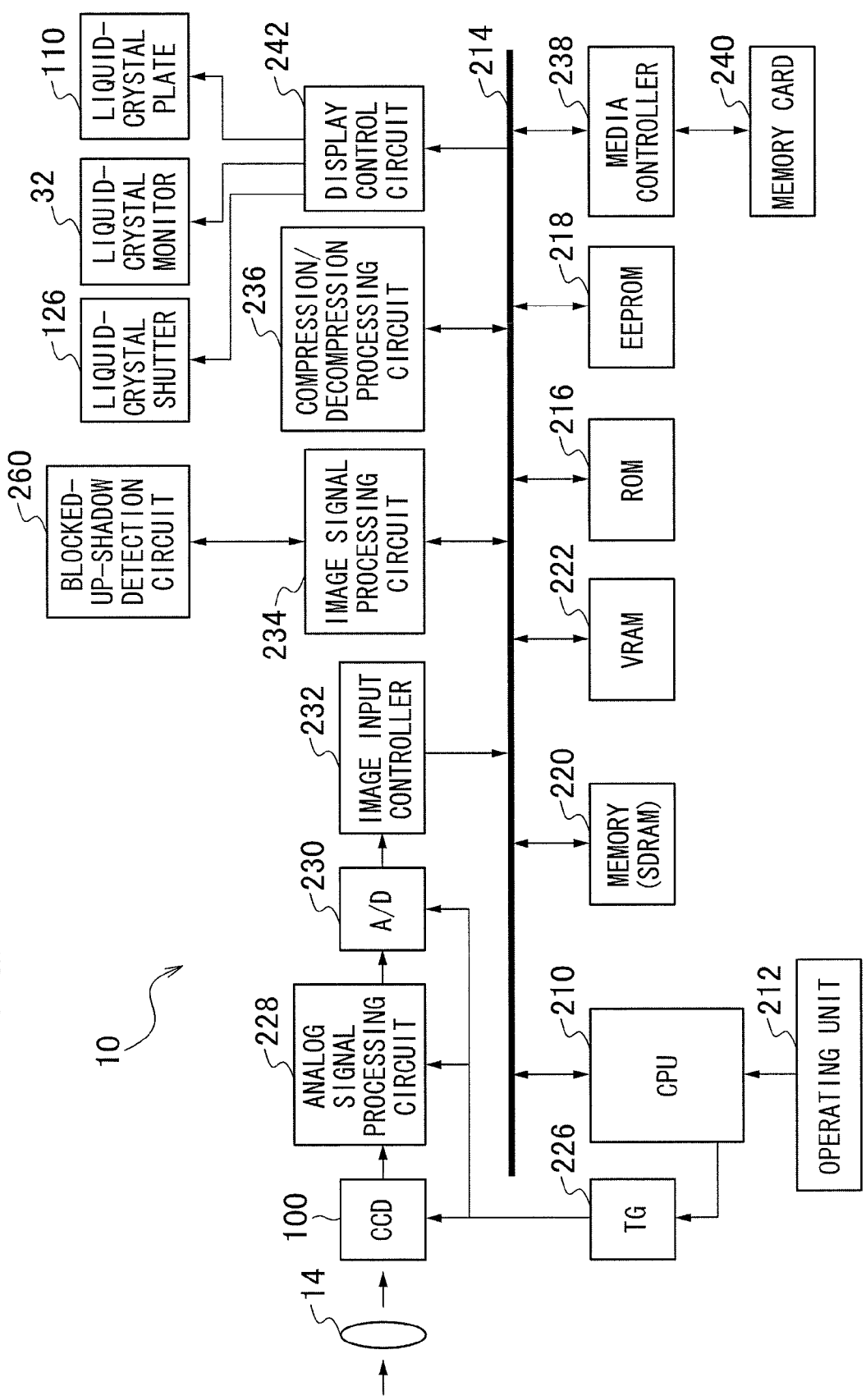
FIG. 7 is a block diagram depicting an electric structure of a digital camera according to a second embodiment.

FIG. 7 is a block diagram depicting an electric structure of the digital camera 10 according to a second embodiment. Note that portions common to those in the block diagram depicted in FIG. 4 are provided with the same reference character, and their detailed description is omitted.

The digital camera 10 according to the present embodiment includes a blocked-up-shadow region detection circuit 260 in place of the blown-out-highlight region detection circuit 250. The blocked-up-shadow region detection circuit 260 detects a pixel with a luminance value smaller than a predetermined value, that is, a blocked-up-shadow region of the subject, in the image signals stored in the memory 220.

Figure 8:
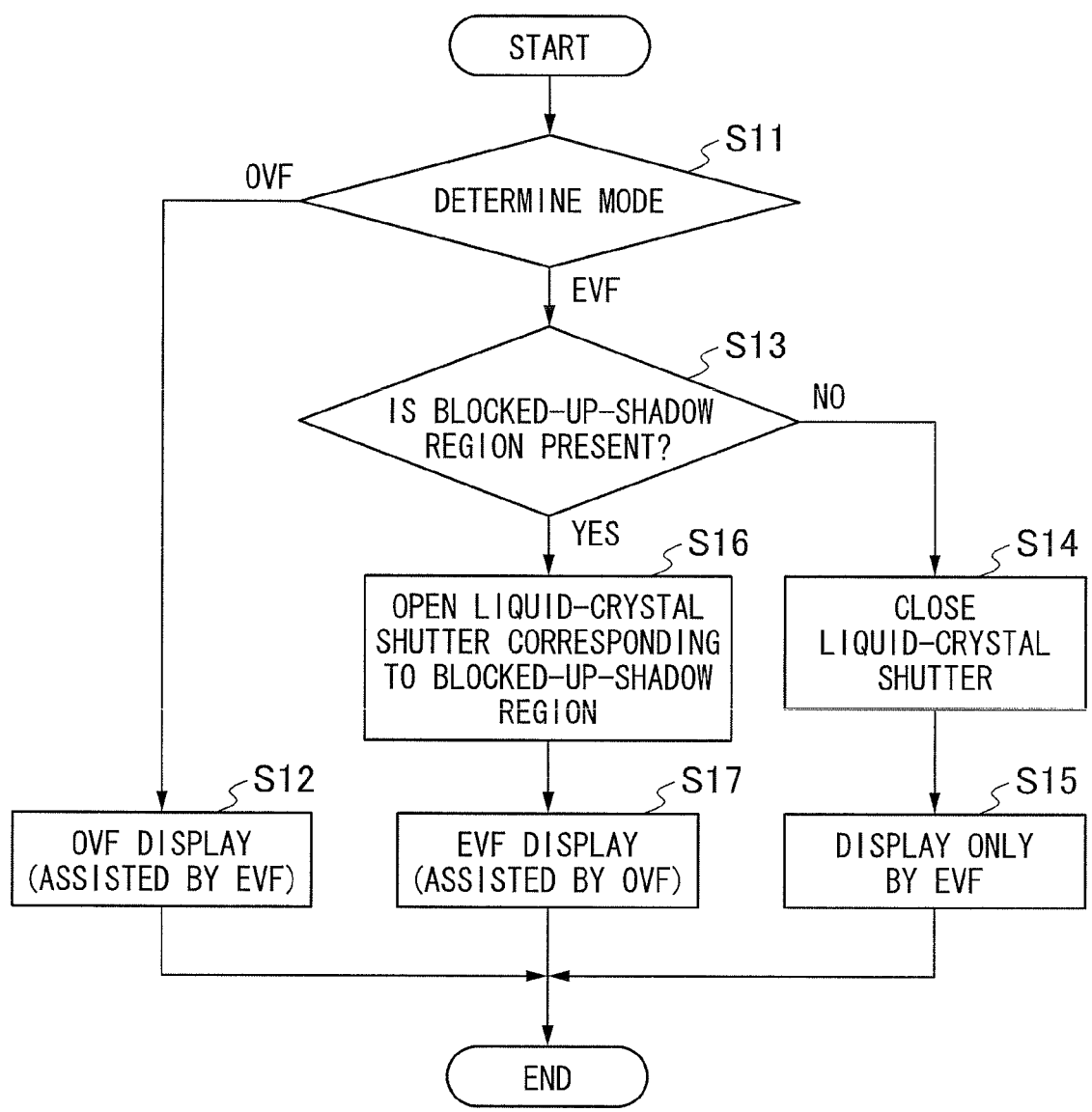
FIG. 8 is a flowchart depicting a display process of a finder according to the second embodiment.

FIG. 8 is a flowchart depicting a finder display process according to the present embodiment.

As with the first embodiment, it is determined whether a finder mode set in the digital camera 10 is OVF or EVF (step S11). When the OVF mode is set, OVF display is performed (step S12). That is, the display control circuit 242 sets the entire region of the liquid-crystal shutter 126 in a transmission state. Also, assist information is displayed on the liquid-crystal plate 110.

When the EVF mode is set, the blocked-up-shadow region detection circuit 260 detects a pixel with a luminance value smaller than the predetermined value in the image signals obtained by picture-taking by the CCD 100 and stored in the memory 220 (step S13).

If a pixel with a luminance value smaller than the predetermined value is not present, the display control circuit 242 sets the entire region of the liquid-crystal shutter 126 in a light-shielding state (step S14), and normal EVF display is performed (step S15). Here, the image displayed on the liquid-crystal plate 110 is horizontally inverted by the half-mirror surface 122M to be guided to the finder ocular unit 38. Therefore, the display control circuit 242 causes the image signal taken by the CCD 100 and stored in the memory 220 to be displayed on the liquid-crystal plate 110 as being horizontally inverted.

With this, subject light entering from the finder objective unit 20 is shielded by the liquid-crystal shutter 126, and only the image displayed on the liquid-crystal plate 110 is horizontally inverted by the half-mirror surface 122M to be guided to the finder ocular unit 38.

Therefore, the user can view the EVF image by viewing through the finder ocular unit 38. Here, the assist information may be simultaneously displayed on the liquid-crystal plate 110.

Figure 9A:
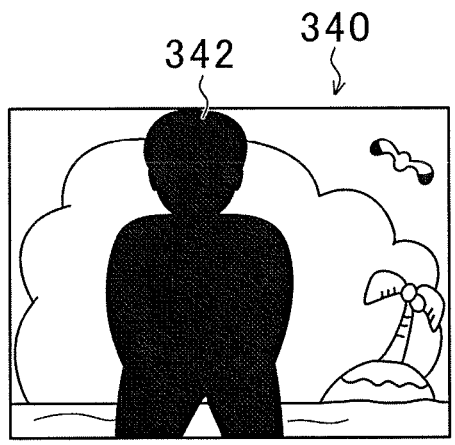
FIG. 9A is a diagram depicting an example of an image taken by a CCD.

On the other hand, the case in which a saturated pixel is present in the determination at step S13 is described by using FIG. 9A to FIG. 9D. FIG. 9A is a diagram depicting an example of an image 340 taken by the CCD 100. This image 340 is an image taken bright outdoors. Here, each pixel in a region corresponding to a person portion has a luminance value smaller than a predetermined value due to backlight. That is, it is assumed that these pixels are blocked-up-shadows. The blocked-up-shadow region detection circuit 260 detects this blocked-up-shadow region 342.

When a blocked-up-shadow region is detected as in FIG. 9A, the procedure goes to step S16. At step S16, the display control circuit 242 takes a parallax between OVF and EVF into consideration and, among the pixels of the liquid-crystal shutter 126, sets a pixel which subject light of the subject corresponding to the detected blocked-up-shadow region in a transmission state and other pixels in a light-shielding state. That is, the liquid-crystal shutter 126 is controlled so that, of the subject light entering from the finder objective unit 20, only the region corresponding to the blocked-up-shadowed subject becomes transmissive and other regions are light-shielded.

Figure 9B:
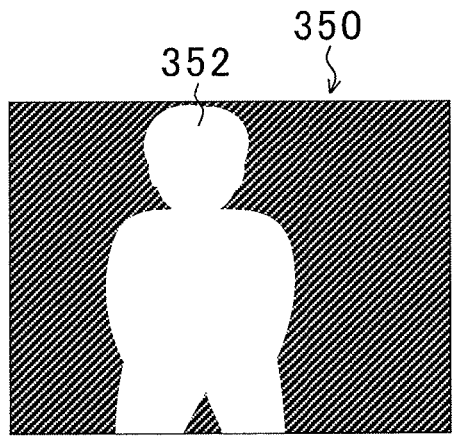
FIG. 9B is a diagram depicting a transmission state and a light-shielding state of a liquid-crystal shutter.

FIG. 9B is a diagram depicting the state in which, in an entire region 350 of the liquid-crystal shutter 126, a region 352 which subject light of a subject corresponding to the blocked-up-shadow region 342 of the image 340 depicted in FIG. 9A enters is set in a transmission state and other regions are set in a light-shielding state.

Furthermore, the display control circuit 242 performs EVF display (step S17). Here, the image displayed on the liquid-crystal plate 110 is horizontally inverted by the half-mirror surface 122M to be guided to the finder ocular unit 38. Therefore, the liquid-crystal plate 110 displays the image taken by the CCD 100 as being horizontally inverted.

Figure 9C:
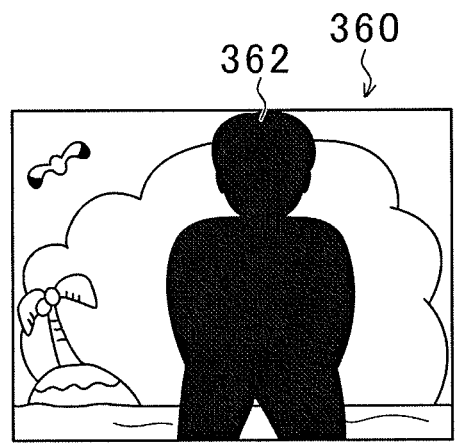
FIG. 9C is a diagram depicting a display of a liquid-crystal plate.

FIG. 9C is a diagram depicting an image 360 obtained by horizontally inverting the image 340 for display on the liquid-crystal plate 110. Here, since a region 362 corresponding to the blocked-up-shadow region 342 does not pose a problem when OVF assist display is performed, the region 362 is displayed as it is. Note that a mode of not displaying the region 362 is possible.

The image displayed on the liquid-crystal plate 110 in the above-described manner is horizontally inverted by the half-mirror surface 122M, and enters the ocular lens 124.

On the other hand, of the subject light entering the finder objective unit 20, only subject light entering a region 352 of the liquid-crystal shutter 126 passes through the liquid-crystal shutter 126, and other regions are light-shielded. The subject light passing through the region 352 of the liquid-crystal shutter 126 passes through the objective lens 120 and the half-mirror surface 122M and enters the ocular lens 124.

As such, subject light passing through the region 352 of the liquid-crystal shutter 126 and further passing through the objective lens 120 and the half-mirror surface 122M is superposed on the image displayed on the liquid-crystal plate 110 and horizontally inverted by the half-mirror surface 122M.

Figure 9D:
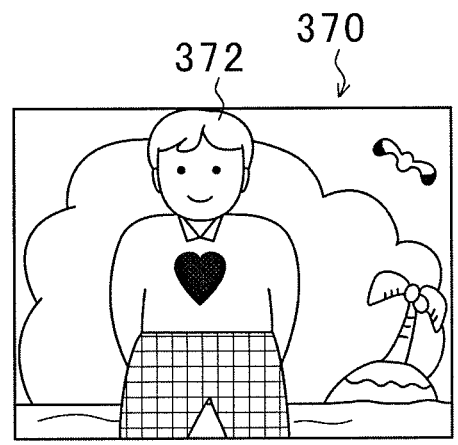
FIG. 9D is a diagram depicting an image viewed from an ocular unit of the finder.

FIG. 9D is a diagram depicting an image viewed from the finder ocular unit 38. As depicted in the drawing, because of transmission through the liquid-crystal shutter 126 regarding a region 372, the OVF picture can be viewed. Therefore, the subject in this region 372 is not blocked-up-shadowed, and the subject can be appropriately confirmed.

Also, regarding regions other than the region 372, since the OVF picture is blocked-up-shadowed by the liquid-crystal shutter 126, the image on EVF (liquid-crystal plate 110) can be viewed.

As such, according to the present embodiment, when EVF display is made in a camera with OVF and EVF capable of superposition display, a blocked-up-shadow region of EVF can be assisted and displayed by OVF. Therefore, a blocked-up-shadowed subject, which cannot be viewed with EVF, can be viewed.

While the region of the liquid-crystal shutter 126 corresponding to the blown-out-highlight region is set in a transmission state in the first embodiment and the region of the liquid-crystal shutter 126 corresponding to the blocked-up-shadow region is set in a transmission state in the second embodiment, both can be combined together. That is, both of the blown-out-highlight region detection circuit 250 and the blocked-up-shadow region detection circuit 260 may be included, and a blown-out-highlight region and a blocked-up-shadow region may be detected in the image taken by the CCD 100, and the regions of the liquid-crystal shutter 126 corresponding to the detected blown-out-highlight region and blocked-up-shadow region may be set in a transmission state.

With this structure, both of the blown-out-highlight region and blocked-up-shadow region can be assisted for display by OVF, and the user can appropriately view the subject.

[Third Embodiment]

Figure 10:
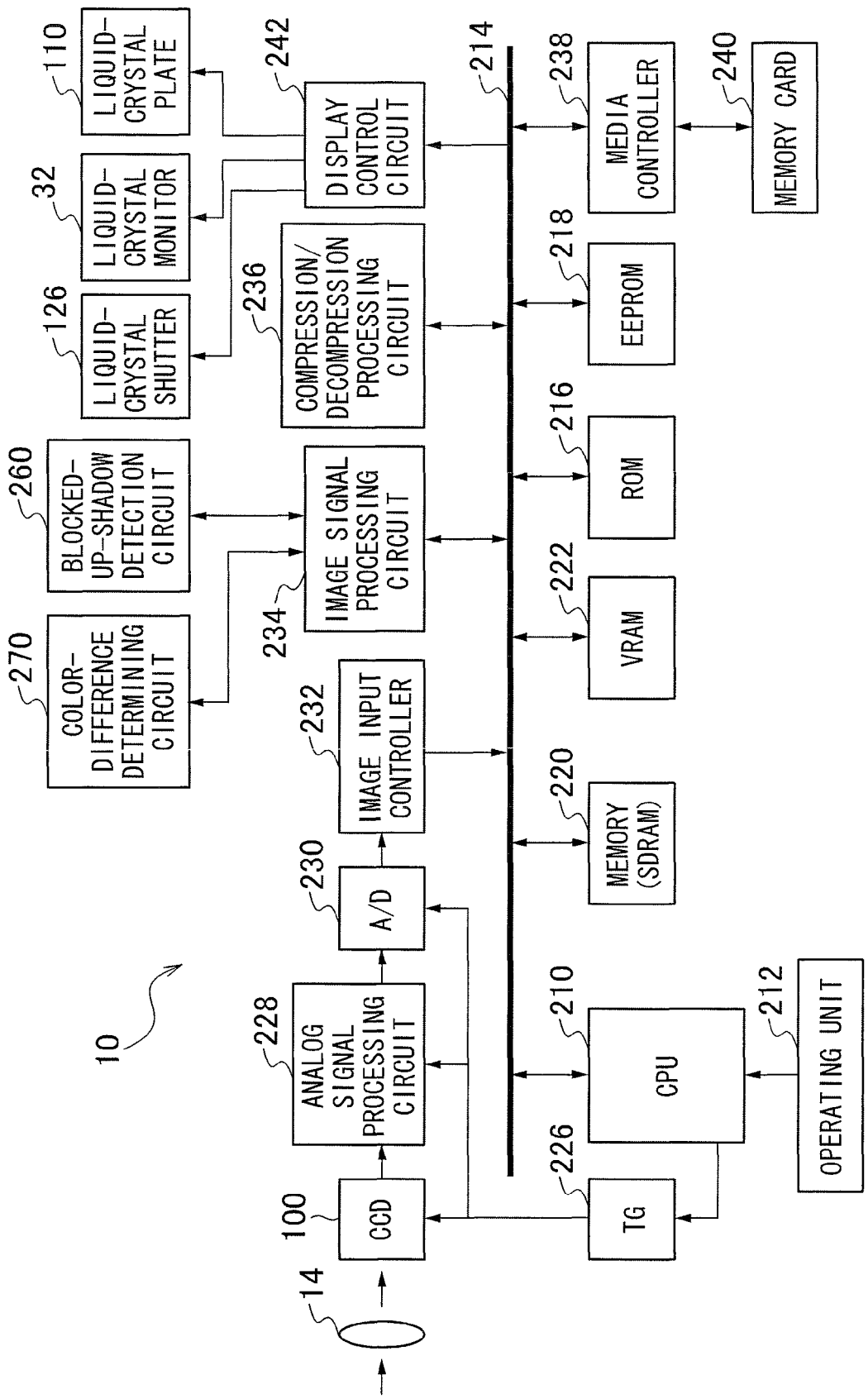
FIG. 10 is a block diagram depicting an electric structure of a digital camera according to a third embodiment.

FIG. 10 is a block diagram depicting an electric structure of the digital camera 10 according to a third embodiment. Note that portions common to those in the block diagram depicted in FIG. 7 are provided with the same reference character, and their detailed description is omitted.

The digital camera 10 according to the present embodiment includes a color-difference determination circuit 270, in addition to the block diagram depicted in FIG. 7. The color-difference determination circuit 270 calculates a white balance from the image signal stored in the memory 220, thereby calculating a color difference between the OVF subject image and the EVF subject image and determining whether the calculated color difference is smaller than a predetermined value.

Figure 11:
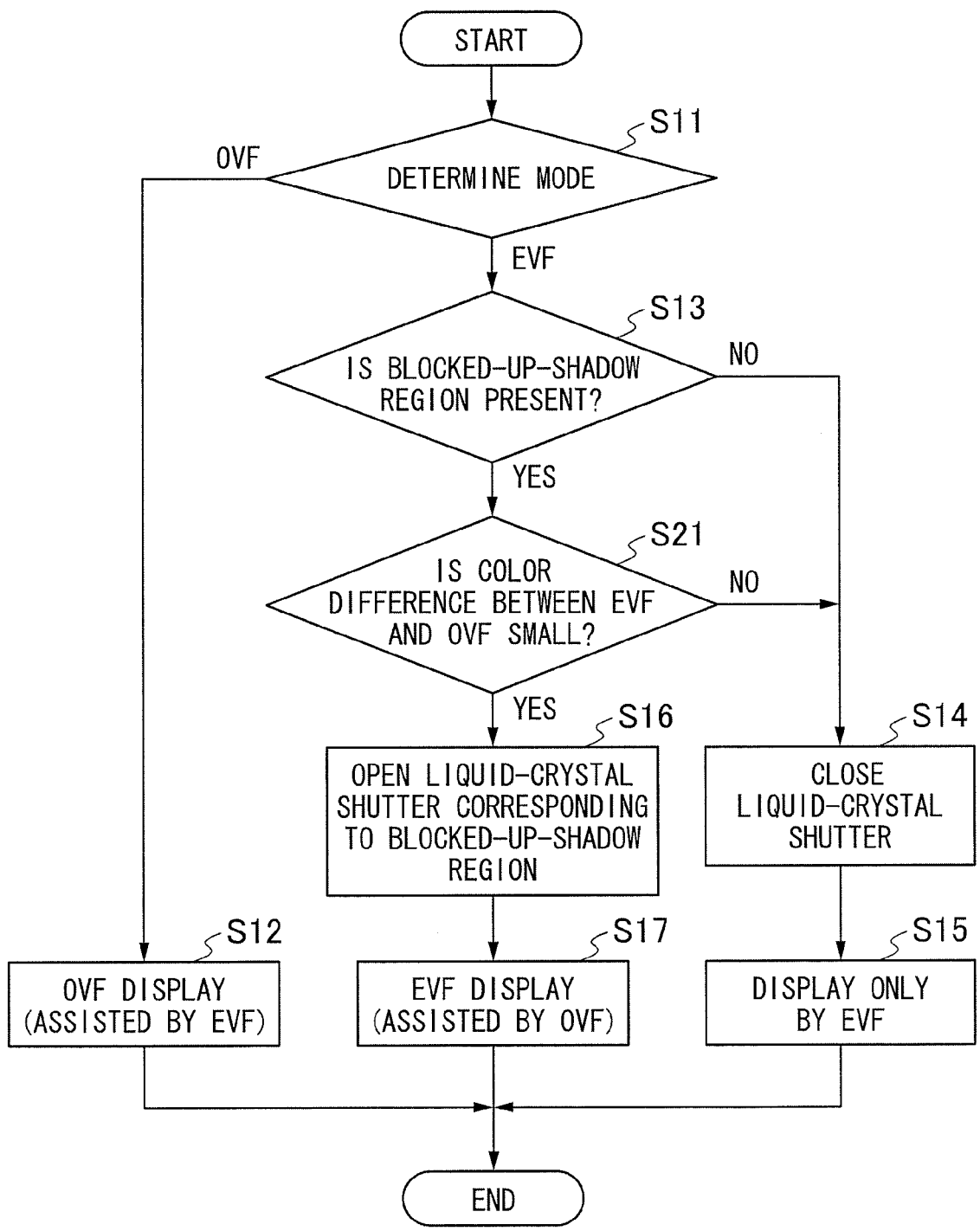
FIG. 11 is a flowchart depicting a display process of a finder according to the third embodiment.

FIG. 11 is a flowchart depicting a finder display process according to the present embodiment. Note that a process when the finder mode is OVF (OVF at step S11) and a process when the finder mode is EVF and no blocked-up-shadow region is present (No at step S13) are similar to those of the flowchart depicted in FIG. 8, and therefore their detailed description is omitted.

When it is determined at step S11 that the finder mode is EVF, the blocked-up-shadow region detection circuit 260 detects a pixel with a luminance value smaller than a predetermined value from the image signals taken by the CCD 100 and stored in the memory 220 (step S13).

Here, when a blocked-up-shadow region is detected, the color-difference determination circuit 270 judges whether the color difference between OVF and EVF is small (step S21).

In the digital camera 10, in order to reproduce a white subject as white in a taken image, white balance adjustment of multiplication by a digital gain according to the light source type is performed at the image signal processing circuit 234. Therefore, a color difference occurs between the OVF subject image and the EVF subject image by a white-balance-adjusted amount.

The color-difference judgment circuit 270 calculates white balance (a white balance correction value) from the image signal stored in the memory 220, calculates a color difference between OVF and EVF from the calculated white balance, and judges whether the calculated color difference is smaller than a predetermined value.

When the color difference between OVF and EVF is smaller than a predetermined value, among the pixels of the liquid-crystal shutter 126, the display control circuit 242 sets a pixel corresponding to a blocked-up-shadow region of the CCD 100 in a transmission state and other regions in a light-shielding state (step S16), and causes the liquid-crystal plate 110 to display the horizontally-inverted image taken by the CCD 100 for EVF display (step S17).

With this, subject light transmitting through the region of the liquid-crystal shutter 126 in the transmission state is superposed on the image displayed on the liquid-crystal plate 110 and horizontally inverted by the half-mirror surface 122M.

On the other hand, when the color difference between OVF and EVF is larger than the predetermined value, the display control circuit 242 sets the entire region of the liquid-crystal shutter 126 in a light-shielding state (step S14) for normal EVF display (step S15).

With this, the blocked-up-shadow region is subjected to EVF display as it is with blocked-up shadow.

When the color difference between OVF and EVF is large, if OVF-assisted display is made in the blocked-up shadow region, chromaticness varies between the EVF display region and OVF display region, possibly providing an uncomfortable feeling to the image. Therefore, OVF-assisted display of the blocked-up-shadow region is performed only when the color difference between OVF and EVF is small.

While OVF-assisted display of the blocked-up-shadow region has been described, the same goes for assisted display of a blown-out-highlight region. That is, when a saturated region is present, a color difference between OVF and EVF is determined, and OVF-assisted display of the blown-out-highlight region is performed only when the color difference is small.

As such, by determining the magnitude of the color difference between OVF and EVF to perform OVF-assisted display of a blown-out-highlight region and a blocked-up-shadow region, display which provides an uncomfortable feeling can be avoided.

Note that the predetermined value at step S21 serving as a threshold to determine whether to perform OVF-assisted display can be determined as appropriate. Also, the predetermined value may be configured so as to be able to be freely set by a user.

[Fourth Embodiment]

While the finders of the first to third embodiments are applied to a camera with the optical axis of OVF and the optical axis of EVF are different from each other, the finders can be applied also as a finder for a single-lens reflex camera.

Figure 12:
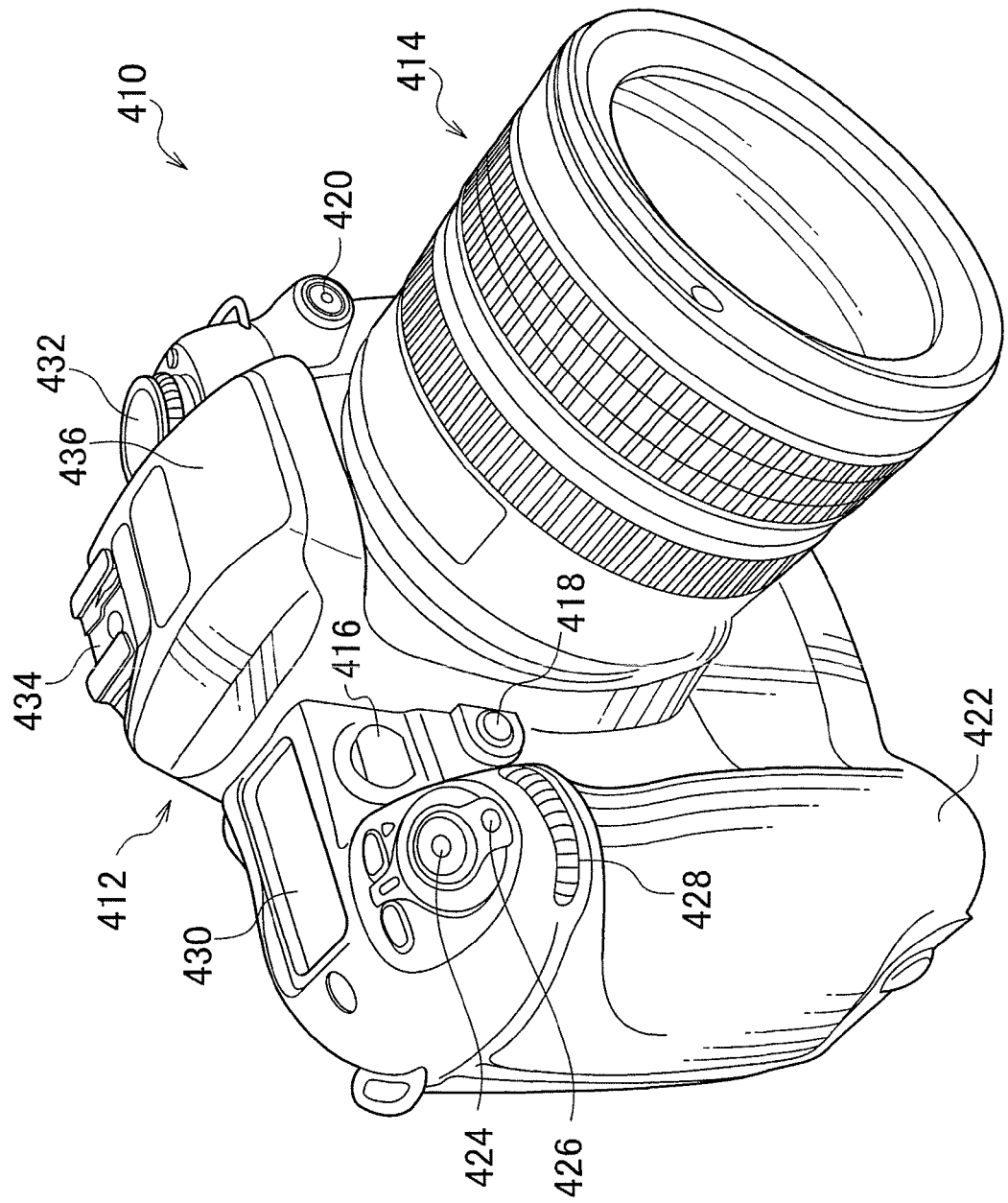
FIG. 12 is a front perspective view depicting an outer appearance structure of a digital single-lens reflex camera.
Figure 13:
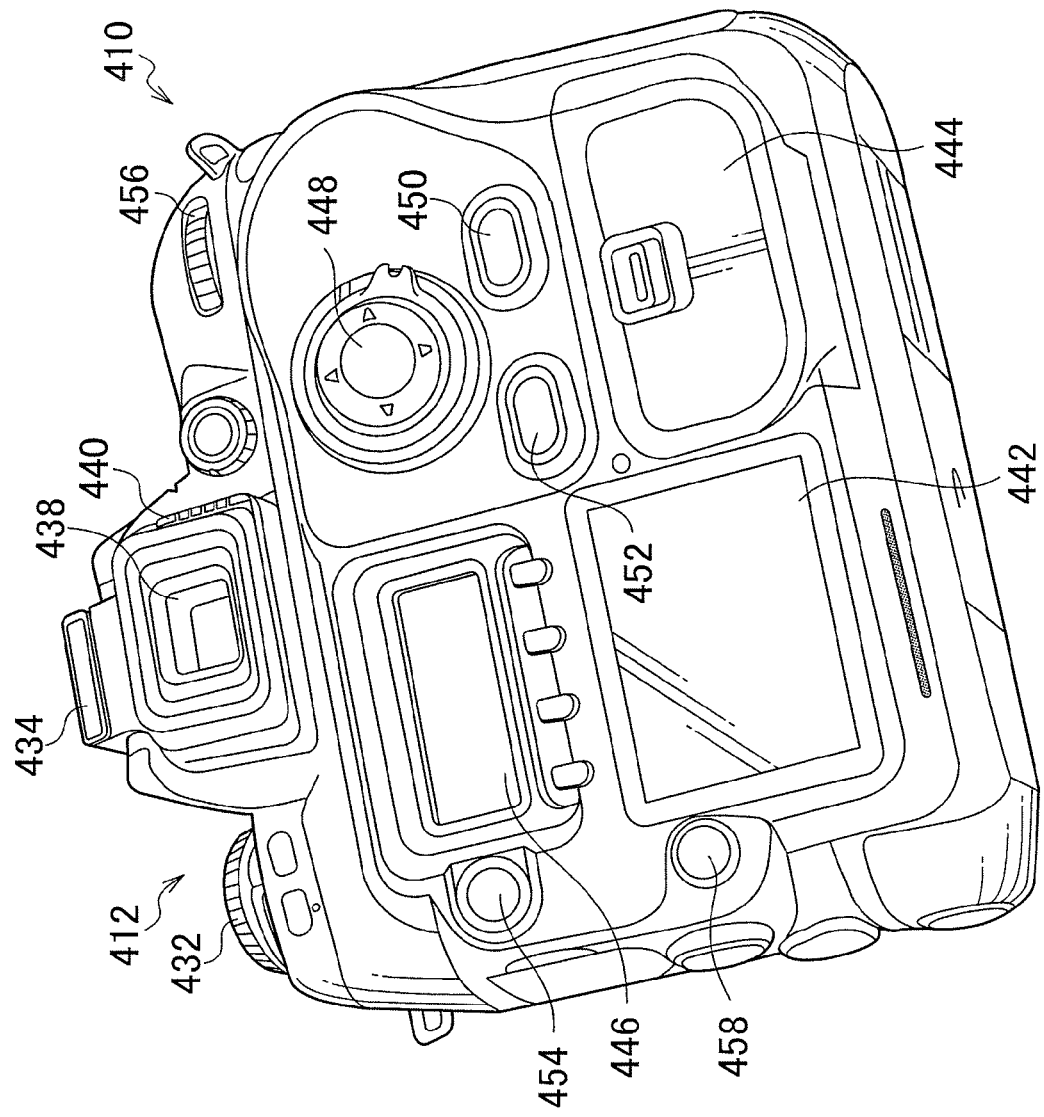
FIG. 13 is a back perspective view depicting the outer appearance structure of the digital single-lens reflex camera.

FIG. 12 and FIG. 13 are a front perspective view and a back perspective view, respectively, depicting an outer appearance structure of a digital single-lens reflex camera 410 according to the present embodiment.

As depicted in the drawings, the digital single-lens reflex camera 410 according to the present embodiment includes a camera body 412 and a taking lens 414 removably mounted on the camera body 412.

The taking lens 414 is mounted on the camera body 412 by mounting a lens-side mount provided at a base end on a camera-side mount provided at the front of the camera body 412.

The front of the camera body 412 is provided with an AF auxiliary light lamp 416, a depth-of-field check button 418, a synchronization terminal 420, a grip 422, and others, in addition to this camera-side mount. The upper surface of the camera body 412 is provided with a shutter button 424, a power supply lever 426, a sub-command dial 428, an upper-surface display panel 430, a mode dial 432, an accessory shoe 434, a strobe 436, and others.

Also, the back surface of the camera body 412 is provided with a finder ocular unit 438, a diopter scale adjustment lever 440, a liquid-crystal monitor 442, a slot cover 444, a back-surface display panel 446, a cross button 448, a menu button 450, a back button 452, a function button 454, a main command dial 456, a replay button 458, and others. The right side surface of the camera body 412 is provided with a tilt adjustment knob and others.

A subject image is checked via the finder ocular unit 438. By viewing through this finder ocular unit 438, a photographer can observe a subject image projected on a focusing screen. The shutter button 424 is of two stages, a full push and a halfway push. AE and AF operations are performed at the time of a halfway push, and the present picture taking is performed at the time of a full push. In the present picture taking, an image obtained by picture taking is stored recorded on a memory card. Also, the image recorded on the memory card is replayed and displayed on the liquid-crystal monitor 442 by setting a camera mode in a replay mode (in the present embodiment, pressing the replay button 458).

Figure 14:
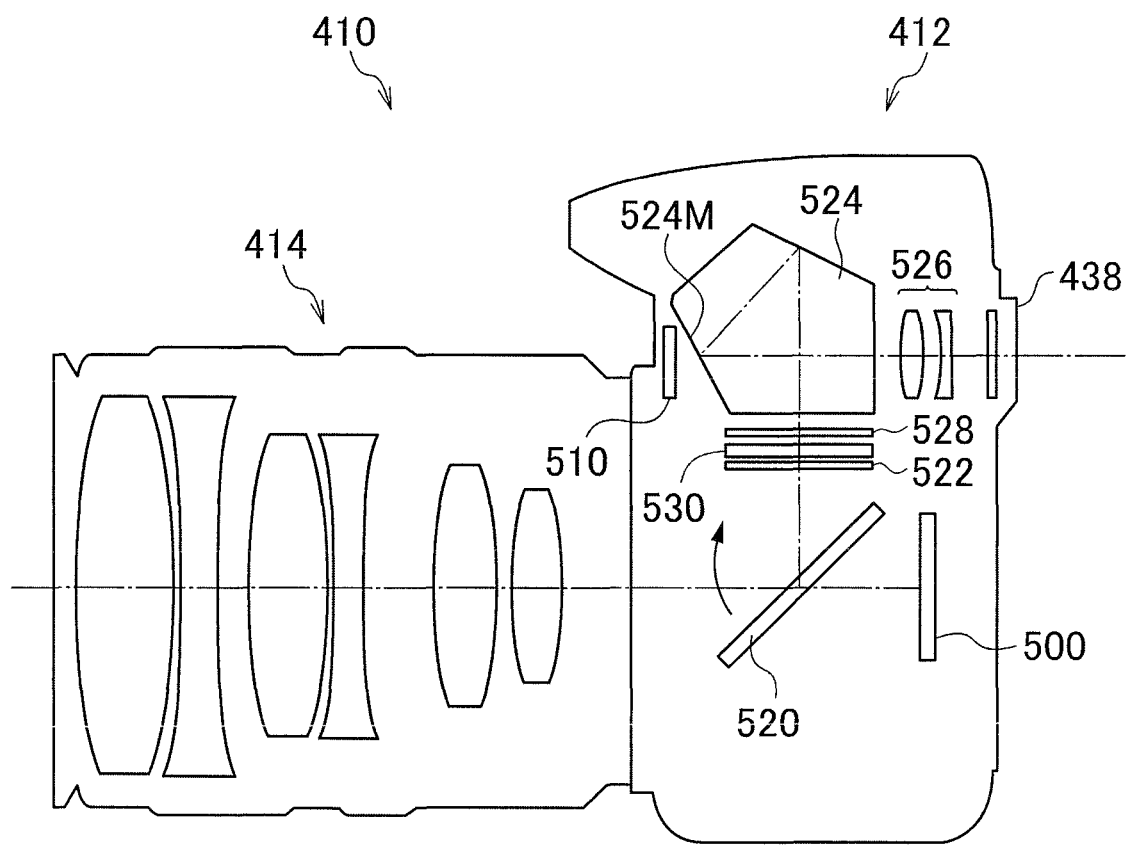
FIG. 14 is a side perspective view depicting the outer appearance structure of the digital single-lens reflex camera.

FIG. 14 is a side perspective view of the digital single-lens reflex camera 410. As depicted in the drawing, the digital single-lens reflex camera 410 includes a CCD 500, a liquid-crystal plate 510, a quick return mirror 520, a focusing screen 522, an ocular lens 526, a pentaprism 524, a view field frame 528, and a liquid-crystal shutter 530.

The quick return mirror 520 is set between the taking lens 414 and the CCD 500 so as to be tilted by 45° with respect to the optical axis of the taking lens 414. Subject light transmitting through the taking lens 414 is reflected by this quick return mirror 520 upward in the drawing.

The focusing screen 522, the liquid-crystal shutter 530, the view field frame 528, and the pentaprism 524 are provided above the quick return mirror 520 in the drawing. A subject image of the subject light reflected by the quick return mirror 520 is formed on a mat surface of the focusing screen 522 as being horizontally inverted.

The liquid-crystal shutter 530 is a liquid-crystal panel placed so as to face the focusing screen 522 and switchable for each region between a transmission state of letting the image of subject light formed on the focusing screen 522 pass therethrough and a light-shielding state of shielding the subject light. The liquid-crystal shutter 530 has the same resolution as the display resolution of the liquid-crystal plate 510, which will be described further below, and can control the transmission state/light-shielding state of any region under the control of the display control unit.

If an entire region of the above-structured liquid-crystal shutter 530 is in a transmission state, the subject image formed on the mat surface of the focusing screen 522 passes through the liquid-crystal shutter 530. With its finder view field (a view field range that can be observed from the finder ocular unit 438) regulated by the view field frame 528, the subject image is then horizontally inverted by the pentaprism 524 to become an erect normal image, and the image is enlarged and observed by the ocular lens 526 from the finder ocular unit 438.

Also, the quick return mirror 520 is configured of a half mirror, letting part of the subject light pass therethrough. Part of the subject light passing through the quick return mirror 520 enters the light-receiving surface of the CCD 500.

The subject image formed on the light-receiving surface of the CCD 500 is converted to a signal charge of an amount according to the incident light amount at each sensor. From the signal charge read from the CCD 500, an image signal is generated by various signal processing circuits.

The liquid-crystal plate 510 can display various images. For example, a picture based on the image signal outputted from the CCD 500. The picture displayed on the liquid-crystal plate 510 passes through a half-mirror surface 524M of the pentaprism 524, guided to the finder ocular unit 38 via the ocular lens 526 together with the subject image formed on the mat surface of the focusing screen 522, and can be viewed by a photographer.

Note that, unlike the above-described digital camera 10, when the liquid-crystal plate 510 displays the image taken by the CCD 500, the taken image is not required to be horizontally inverted, and merely its erect normal image is displayed.

As such, the digital single-lens reflex camera 410 includes OVF of a single-lens reflex type guiding the picture as subject light entering from the taking lens 414 and reflected by the quick return mirror 520 to the finder ocular unit 438 and also includes EVF guiding the picture displayed on the liquid-crystal plate 510 to the finder ocular unit 438. And, with both placed on the same optical path, these pictures are superposed each other and guided to the finder ocular unit 438. Therefore, these two finders function as a hybrid finder through which the photographer can observe superposed pictures.

Also, the quick return mirror 520 is configured to be flipped up in an arrow direction in FIG. 14. With the shutter button 424 pressed by the photographer, the quick return mirror 520 is flipped up and retracted from a picture-taking optical path. As a result, the subject light entering from the taking lens 414 enters the light-receiving surface of the CCD 500, thereby performing the present picture taking. The quick return mirror 520 returns to its original position after the end of picture taking.

Note that, the electrical structure of the digital single-lens reflex camera 400 is similar to that of the above by replacing the taking lens 14, the liquid-crystal monitor 32, the CCD 100, the liquid-crystal plate 110, and the liquid-crystal shutter 126 in the block diagrams depicted in FIG. 4, FIG. 7, and FIG. 10 by the taking lens 414, the liquid-crystal monitor 442, the CCD 500, the liquid-crystal plate 510, and the liquid-crystal shutter 530, and therefore description is omitted.

In the above-structured digital single-lens reflex camera 400, a finder display process similar to those of flowcharts depicted in FIG. 5, FIG. 8, and FIG. 11 can be performed.

That is, for EVF display, assisted display of a blown-out-highlight region and a blocked-up-shadow region can be made by OVF. Therefore, a blown-out-highlighted subject and/or a blocked-up-shadowed subject, which cannot be viewed by EVF, can be viewed.

Also, the magnitude of the color difference between OVF and EVF is determined, and OVF-assisted display is performed only when the color difference is small, thereby avoiding uncomfortable display.

The technical range of the presently disclosed subject matter is not restricted to the range described in the above-described embodiments. The structures and others in the respective embodiments can be combined as appropriate among the embodiments in a range not deviating from the gist of the presently disclosed subject matter.

What is claimed is:

1. A finder comprising:
an imaging unit configured to convert a subject image optically received via an imaging lens to an image signal;
a display unit configured to display the subject image based on the image signal;
an optical view finder configured to guide the subject image incident thereon to an ocular unit;
a shutter unit placed in an optical path of the optical view finder and switchable between a light-shielding state and a non-light-shielding state for each region on which the subject image is incident;
a superposing unit configured to superpose
a subject image passing through the shutter unit and
the subject image displayed on the display unit on each other;
a detecting unit configured to detect a blown-out-highlight region or a blocked-up-shadow region of the subject image in the image signal; and
a control unit configured to control the shutter unit in connection with the detected region detected by the detecting unit, the control unit setting
a region in which a subject image of a subject corresponding to the detected region enters with the region being set in the non-light-shielding state by the shutter unit, and
other regions being set in the light-shielding state by the shutter unit.

2. The finder according to claim 1,
wherein when the detecting unit detects a blown-out-highlight region of the subject image, the display unit does not display the blown-out-highlight region.

3. The finder according to claim 1,
wherein when the detecting unit detects a blown-out-highlight region of the subject image, the display unit replaces the blown-out-highlight region by black for display.

4. The finder according to claim 1, further comprising
a color-difference calculating unit configured to calculate, based on the image signal, a color difference between the subject image entering the optical view finder and the subject image displayed on the display unit,
wherein the control unit sets all regions in the light-shielding state when the calculated color difference is equal to a predetermined value or more.

5. The finder according to claim 4,
wherein the color-difference calculating unit calculates the color difference based on a white balance of the image signal.

6. The finder according to claim 1, further comprising
a correcting unit configured to correct a parallax between the optical view finder and the imaging unit and cause the subject image to be displayed on the display unit.

7. The finder according to claim 1,
wherein the shutter unit is a liquid-crystal shutter, and the non-light-shielding state is a transmission state.

8. The finder according to claim 7,
wherein the liquid-crystal shutter has a resolution equal to a resolution of the display unit.

9. An imaging device comprising:
the finder according to claim 1;
a release button for a photographer to input a picture-taking instruction;
a picture-taking unit configured to obtain an image signal from the imaging unit when the picture-taking instruction is inputted from the release button, and obtain a taken image based on the image signal; and
an image recording unit configured to record the obtained taken image.

10. A display method for a finder the method comprising:
an imaging step of converting a subject image optically received via an imaging lens to an image signal by an imaging unit;
a display step of displaying the subject image based on the image signal on a display unit;
a superposing step of superposing a subject image passing through a shutter unit and the subject image displayed on the display unit on each other, wherein the shutter unit is placed in an optical path of an optical view finder configured to guide the subject image incident thereon to an ocular unit, the shutter unit being switchable between a light-shielding state and a non-light-shielding state for each region on which the subject image is incident;
a detecting step of detecting a detected region which is a blown-out-highlight region or a blocked-up-shadow region of the subject image in the image signal; and
a control step of setting
a region in which a subject image of a subject corresponding to the detected region enters with the region being set in the non-light-shielding state and
other regions being set in the light-shielding state.

* * * * *